(12) United States Patent
Collins, Jr. et al.

(10) Patent No.: US 6,307,662 B1
(45) Date of Patent: Oct. 23, 2001

(54) BLAZED DIFFRACTION SCANNER

(75) Inventors: Donald A. Collins, Jr.; Paul O. Detwiler; Barry M. Mergenthaler, all of Lawrenceville; Hong Tang, Suwanee, all of GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/234,833

(22) Filed: Jan. 21, 1999

(51) Int. Cl.$^7$ ................................................. G02B 26/08
(52) U.S. Cl. ............................ 359/209; 359/18; 359/571
(58) Field of Search ................................ 359/17, 18, 209, 359/211, 571

(56) References Cited

U.S. PATENT DOCUMENTS

| | | |
|---|---|---|
| 3,626,321 | 12/1971 | Smith ................................. 331/94.5 |
| 4,289,371 | 9/1981 | Kramer . |
| 4,416,505 | 11/1983 | Dickson . |
| 4,647,143 * | 3/1987 | Yamazaki et al. ..................... 359/18 |
| 4,842,969 * | 6/1989 | Kawatsuki et al. .................. 359/571 |
| 4,852,956 | 8/1989 | Kramer . |
| 5,003,600 | 3/1991 | Deason et al. ......................... 380/54 |
| 5,237,160 * | 8/1993 | Baba ..................................... 359/18 |
| 5,504,317 | 4/1996 | Takahashi ............................ 235/462 |
| 5,619,350 * | 4/1997 | Taki ..................................... 359/18 |
| 5,680,232 | 10/1997 | Iwamatsu et al. ..................... 359/18 |
| 5,691,831 | 11/1997 | Taki ..................................... 359/18 |
| 5,728,324 * | 3/1998 | Welch et al. .......................... 265/2.5 |

* cited by examiner

Primary Examiner—Darren Schuberg
(74) Attorney, Agent, or Firm—Francis L. Conte

(57) ABSTRACT

A scanner includes a laser for projecting a laser beam at a facet having a blazed diffractive grating thereon. The facet is rotated relative to the laser to traverse the laser beam across the grating to diffract the laser beam into a scan line. The blazed diffractive grating may be readily manufactured using injection molding or photolithograhic manufacturing techniques.

15 Claims, 4 Drawing Sheets

BLAZED DIFFRACTION SCANNER

BACKGROUND OF THE INVENTION

The present invention relates generally to laser beam scanning, and, more specifically, to barcode scanners.

In a typical laser barcode scanner, a laser beam is projected at a rotating spinner having several mirror facets from which the laser beam is reflected at different angles. The reflected beams meet corresponding pattern mirrors which steer the beams out a common window above which a barcode is positioned. The barcode may take any conventional form such as the Universal Product Code (UPC) which includes a series of dark bars and light spaces therebetween of varying widths for encoding desired data.

The barcode is read by traversing the laser beam as a scan line across the successive bars and spaces for producing reflected light which varies in intensity corresponding therewith. The so modulated reflected light is reflected back into the scanner wherein it is detected by a photodetector and decoded in a conventional manner to correspondingly decode the barcode itself.

Since the barcode may be positioned atop the scanner window in various orientations, the spinner facets and cooperating pattern mirrors are selected for producing an intersecting pattern of scan lines across the barcode for ensuring that at least one scan line properly traverses the barcode. Accordingly, the pattern mirrors must be differently oriented in space and spaced apart from each other. The spinner facets are oriented at different inclination angles atop the spinner. Each spinner facet therefore traverses a group of pattern mirrors as the spinner rotates for producing a corresponding set of short scan lines which are projected through the scanner window. The scan line set for each spinner facet is different to produce the entire scan pattern.

However, this configuration is boxy and has a correspondingly large space requirement. The facets mounted on the spinner limit the rotational speed of the spinner in view of the large size thereof.

Another type of barcode scanner was unsuccessfully placed in commercial use in the last decade based on the principle of holography. In the holographic barcode scanner, a specially configured holographic deflector was rotated for diffracting laser light for producing scan lines. This scanner was not commercially viable apparently for the difficulty and attendant cost of manufacturing the holographic deflector.

The holographic deflector includes a hologram manufactured by exposing a suitable medium, such as silver halide, using two incident laser beams in a specific orientation to create a hologram having an interference fringe pattern. The resultant hologram must be accurately positioned in the scanner for receiving the incident laser beam along the same path as used in forming the hologram originally. Light diffracted from the hologram is then used as a scan line projected outwardly in a predetermined path based on the original orientation of the beams producing the hologram.

Accordingly, it is desired to produce a simpler and more compact barcode scanner without the need for complex and costly holograms.

SUMMARY OF THE INVENTION

A scanner includes a laser for projecting a laser beam at a facet having a blazed diffractive grating thereon. The facet is rotated relative to the laser to traverse the laser beam across the grating to diffract the laser beam into a scan line.

The blazed diffractive grating may be readily manufactured using injection molding or photolithograhic manufacturing techniques.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
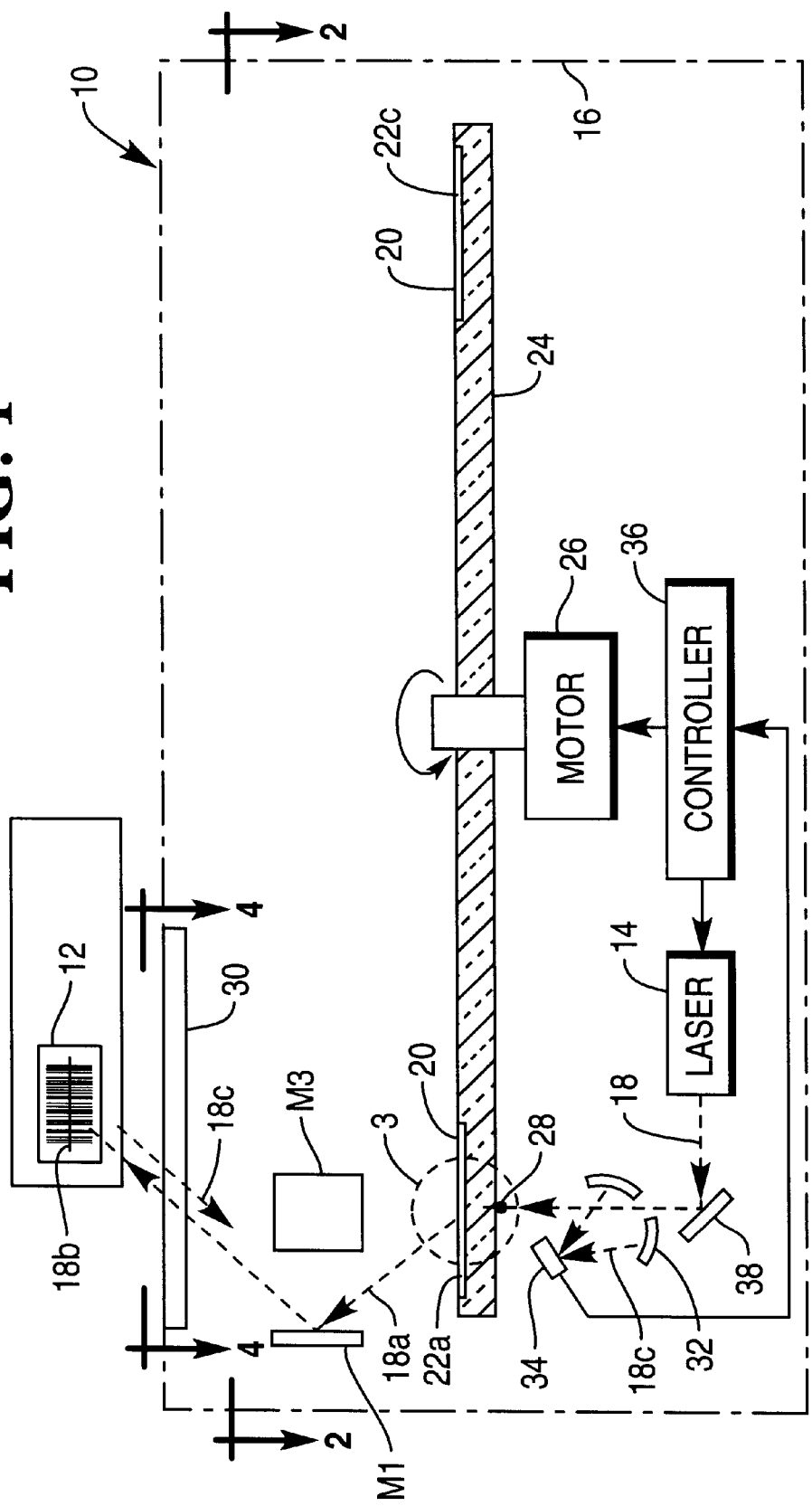
FIG. 1 is a schematic, elevational view of a barcode scanner in accordance with an exemplary embodiment of the present invention having a plurality of diffraction gratings mounted coplanar atop a rotating disk.

Illustrated schematically in FIG. 1 is a scanner 10 configured for reading a barcode 12 in accordance with an exemplary embodiment of the present invention. The barcode 12 may take any conventional form such as the Universal Product Code (UPC) having a series of alternating dark bars and light spaces therebetween of varying width for storing data. The barcode 12 is typically found on an item, such as a retail product, and is encoded with product description and price for subsequent decoding by the scanner for use in a typical retail establishment for example.

The scanner 10 includes a conventional laser 14 which is suitably mounted in a fixed or stationary manner in a corresponding frame or housing 16. The laser 14 is effective for projecting a laser beam 18 for use in decoding the barcode 12.

Figure 2:
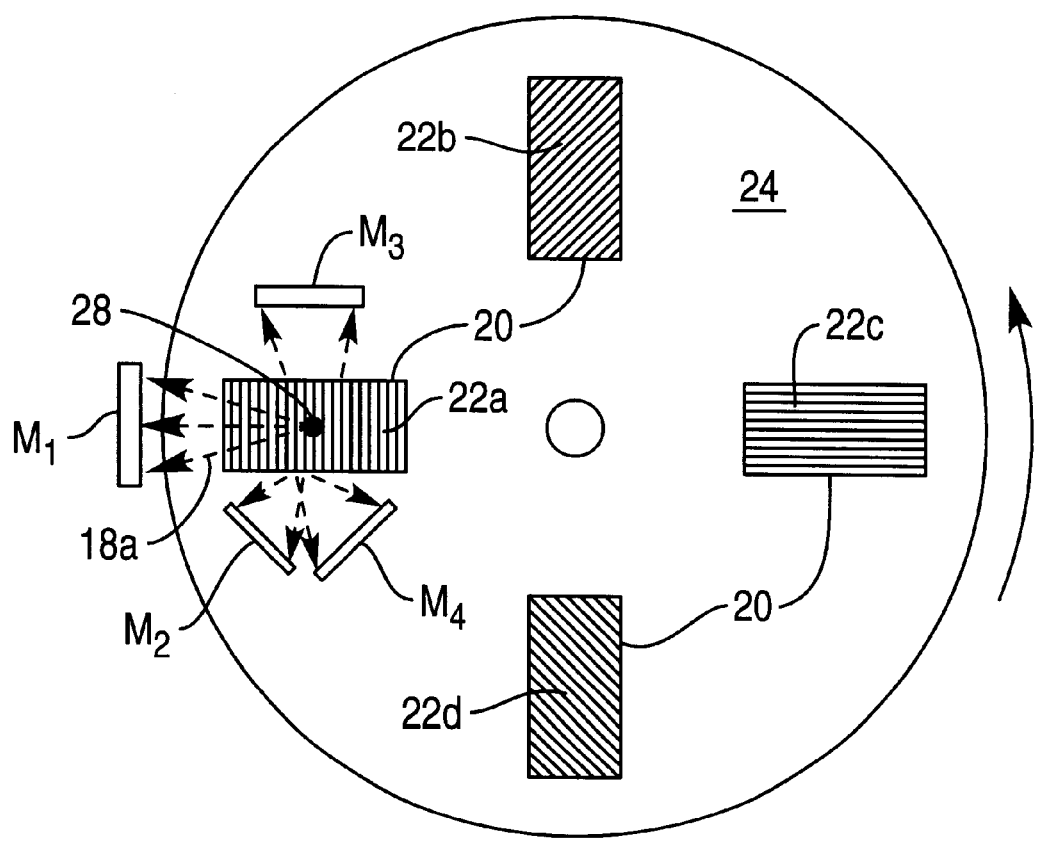
FIG. 2 is a plan view of the rotating disk illustrated in FIG. 1 and taken generally along line 2—2.

As shown in section in FIG. 1 and in top view in FIG. 2, one or more deflectors or facets 20 are suitably disposed in optical alignment with the laser 14 for receiving the beam 18 therefrom. As shown in exaggerated form in FIGS. 2 and 3, each facet 20 has a blazed diffractive grating 22a–d in accordance with the present invention for suitably diffracting the incident laser beam 18 thereat.

Means in the exemplary form of a flat circular disk 24 and motor 26 as illustrated in FIG. 1 are provided for rotating the facets 20 relative to the laser 14 to traverse the laser beam 18 across the gratings 22a–d to diffract the laser beam 18 into a diffracted scan beam 18a which traces a scan line 18b across the barcode 12 as the disk 24 rotates.

In the preferred embodiment illustrated in FIGS. 1 and 2, the disk 24 includes a plurality of the facets 20 spaced circumferentially apart from each other at preferably equal angles on the common top side of the disk. Each facet 20 preferably has a different orientation or blazed diffractive grating 22a–d thereon. The motor 26 is operatively joined coaxially to the disk 24 either directly or indirectly for spinning or rotating the disk 24 to rotate the facets 20 in turn past the stationary laser 14 and the laser beam 18 emitted therefrom. In this way, the disk and motor are effective for sequentially rotating the different facets 20 in a common plane in turn past the laser 14 to produce respective different ones of the scan lines 18b by diffracting the laser beam along or across the different gratings 22a–d on the facets 20.

Since the disk 24 is preferably flat for maintaining a thin profile of the scanner 10, all the facets 20 are suitably joined to the top thereof in a coplanar configuration. Each of the facet gratings 22a–d is preferably a relatively simple linear plane diffraction grating.

Since the facets 20 illustrated in FIG. 1 are coplanar and flat with the disk 24, they rely on the principle of light diffraction so that the incident laser beam 18 may be redirected by diffraction for sequentially generating the short scan lines 18b as each facet in turn interrupts the laser beam 18 as the disk 24 spins.

In the preferred embodiment illustrated in FIGS. 1 and 2, the facets 20 are disposed adjacent the perimeter or outer diameter of the disk 24 near the maximum radius from the axial centerline rotational axis. The laser 14 is stationary in the housing 16, and is optically aligned with a single spot or target 28 adjacent the disk perimeter in the path of the rotating facets 20. In this way, the laser beam 18 hits the target 18 along arcuate paths on each of the facets 20 in turn as they spin with the disk 24 past the stationary target.

In the FIG. 1 embodiment, the facets 20 are disposed atop the disk 24, and the disk 24 is optically transparent below the facets 20. The laser 14 is disposed below the disk to project the laser beam upwardly through the disk itself to the facets thereatop to diffract the scan lines upwardly above the disk. This defines a transmissive deflection scanner wherein the laser beam 18 passes upwardly through the disk 24 and through the corresponding gratings 22a–d for diffraction. The respective gratings themselves are suitably transparent and may be formed independently of the disk 24 and attached thereto, or may be integrally formed therewith using a common transparent material such as optical plastic or glass.

Figure 3:
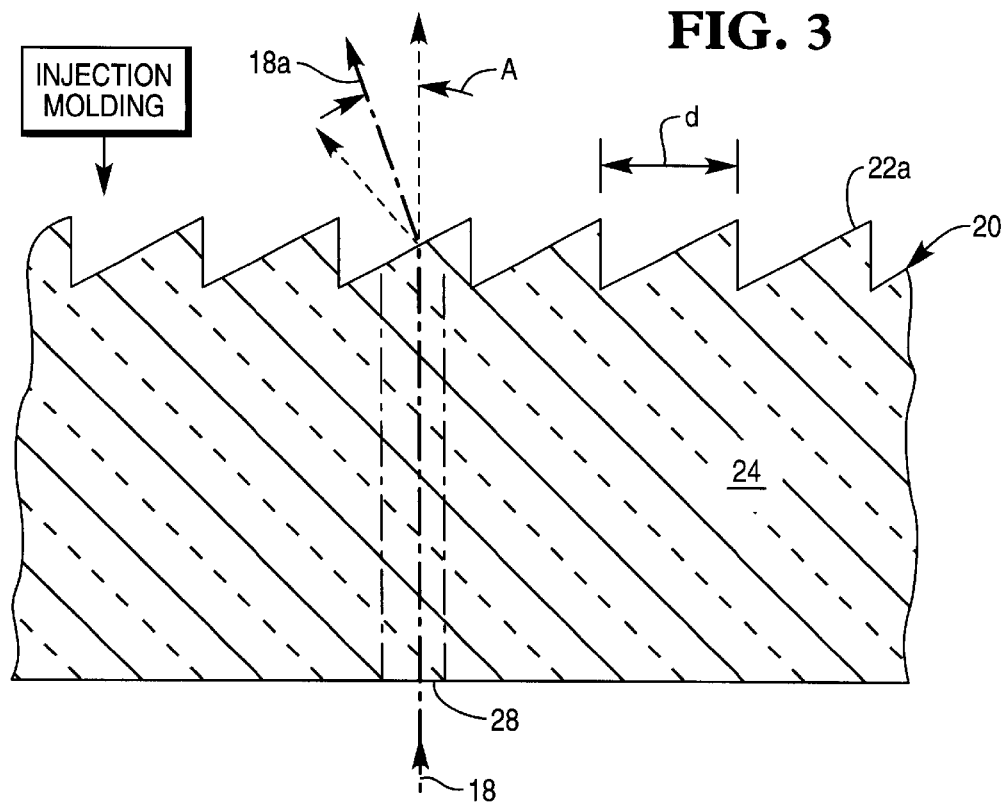
FIG. 3 is an elevational sectional view through a portion of the diffraction grating in the disk illustrated in FIG. 1 within the circle labeled 3.

FIG. 3 illustrates in exaggerated form a section of the disk 24 and facet 20 including a portion of the first diffractive grating 22a. Diffraction is a well known optical phenomenon. Linear gratings are also well known and include a series of straight, parallel minute rulings having a spacing represented by a conventional grating constant or period d. Diffraction grating is a one dimensional effect identified by the grating constant d which determines the angle of diffraction of light in the grating. The grating constant is a function of laser beam wavelength, diffraction angle A, and order of diffraction, and is minute in value on the order of microns. The diffraction rulings are therefore not typically visible to the naked eye, and are illustrated in exaggerated form in FIGS. 2 and 3 for clarity of presentation.

As shown in FIG. 3, the incident laser beam 18 is traveling vertically upwardly and perpendicular to the bottom surface of the disk 24 as it reaches the target 28 and travels upwardly through the disk to the underside of the grating 22a. A basic diffraction grating has symmetrical rulings which are generally square-toothed or sinusoidal in configuration (not shown) for diffracting the incident light with primary intensity in the zero-order of diffraction which is coincident with the direction of the incident light as illustrated by the vertical dashed line in FIG. 3. The zero-order diffracted light is useless in the present invention since it will fail to generate any scan lines at all.

Accordingly, the diffractive grating in the present invention is blazed to obtain maximum diffraction intensity for preferably the first-order of light diffraction at the diffraction angle A illustrated in FIG. 3 for the diffracted scan beam 18a illustrated. The second-order diffracted beam is also illustrated by the larger angle, dashed line illustrated in FIG. 3, but its effect is negligible in view of the blazing.

Blazing in a simple embodiment as illustrated in FIG. 3 is effected in each of the facet gratings 22a–d by using a sawtooth or triangular blazed configuration or section for the rulings. The blazing angle of the sawtooth rulings illustrated in FIG. 3 is a function of the index of refraction of the diffraction material and the selected diffraction order, such as the first order desired. In this way, the incident laser beam 18 upon engaging the grating rulings is suitably diffracted so that rotation of the facets 20 in a plane oblique to the incident beam causes the diffracted beam 18a to follow a corresponding short arcuate path to generate the respective scan lines 18b.

Identical gratings are not preferred when using a single laser source since they would merely trace the same scan lines without difference. Accordingly, each of the several facets 20 as illustrated in FIG. 2 has a different grating thereon to produce correspondingly different scan lines therefrom. For example, FIG. 2 illustrates that the first grating 22a has vertical rulings which are oblique to the radii of the disk 24. The second grating 22b has diagonal rulings in one direction. The third grating 22c has horizontal rulings oblique with the radii of the disk 24 and perpendicular to the first grating 22a. And, the fourth grating 22d has diagonal rulings opposite to those of the second grating 22b. In these examples, the incident laser beam 18 will be diffracted differently at each of the gratings for producing correspondingly different scan lines therefrom. These different scan lines will travel in different directions away from the rotating disk 24.

Accordingly, the scanner 10 preferably also includes a plurality of steering or pattern mirrors M1–4 which are optically aligned with the laser target 28, and angled or oriented differently from each other for cooperating with respective ones of the facets 20 as they in turn pass over the target 28 for steering the diffracted scan lines from the gratings. The several mirrors M1–4 are preferably aligned with the common target 28 for steering the diffracted scan lines from the respective gratings 22a–d together into an intersecting scan pattern of lines as illustrated for example in FIG. 4.

As shown in FIGS. 1 and 2, the first pattern mirror M1 may be aligned radially outwardly or outboard of the target 28 so that as the first grating 22a passes the target 28, the diffracted scan beam 18a is reflected from the first mirror M1 to generate the corresponding scan line. Similarly, the second pattern mirror M2 is adjacent the target 28 and generally parallel to the rulings of the second grating 22b as they traverse the target 28 for reflecting the diffracted scan beam in a corresponding scan line. The third pattern mirror M3 is also disposed adjacent the target 28 and generally parallel to the rulings of the third grating 22c for reflecting the diffracted scan beam therefrom for forming the corresponding scan line as the third grating 22c traverses the target 28. And, the fourth pattern mirror M4 is disposed adjacent the target 28 and generally parallel to the rulings of the fourth grating 22d as it traverses the target 28 for diffracting the scan beam and reflecting it from the fourth mirror M4 to produce the corresponding scan line therefrom.

Figure 4:
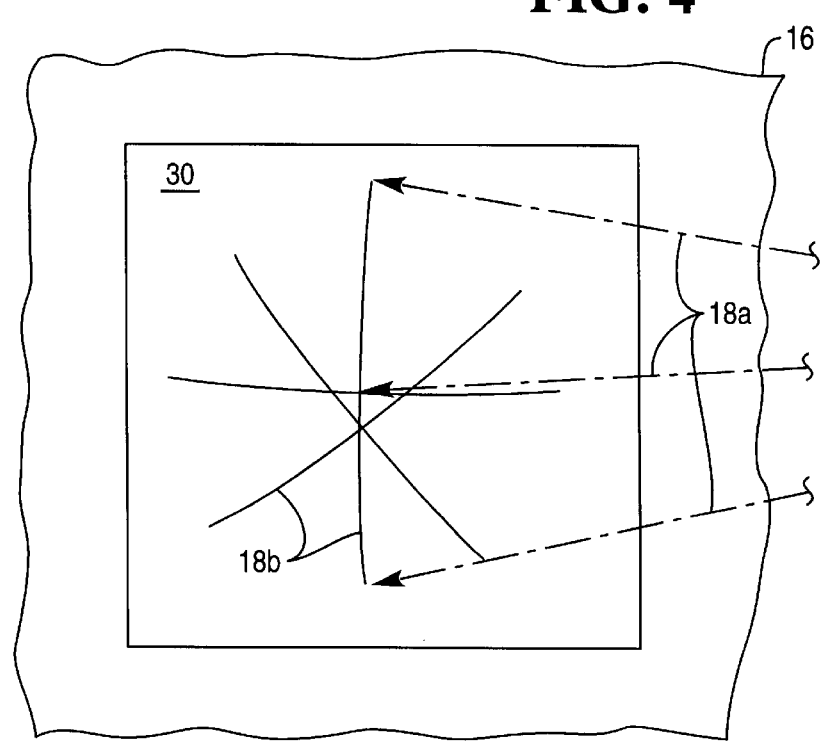
FIG. 4 is a plan view of a window atop the scanner shown in FIG. 1 illustrating an exemplary scan line pattern projected therethrough.

Although four exemplary pattern mirrors are illustrated in the FIG. 2 embodiment, one or more thereof may be eliminated or combined as desired in order to suitably group together the corresponding scan lines in a suitable scan line pattern such as the exemplary pattern illustrated in FIG. 4.

The scanner illustrated in FIG. 1 also includes a top window 30 through which the scan pattern of FIG. 4 is projected to the barcode 12 positionable thereat. The scan pattern increases the likelihood that at least one of the individual scan lines will properly traverse the barcode for producing a suitable reflected light or beam 18c.

Means in the form of a spherical collection mirror 32 are suitably disposed in the housing 16 for collecting the reflected light 18c from the barcode 12 upon traverse thereof by the scan lines. The collection mirror 32 is preferably optically disposed between the laser 14 and the disk 24 for collecting and focusing the reflected light 18c.

Means in the exemplary form of a conventional photodetector 34 are optically aligned with the collection mirror 32 for detecting the focused light therefrom, and cooperates with a conventional electrical controller 36 operably joined to the photodetector 34 for decoding the light detected thereby. The controller 36 is also operatively joined to the laser 14 for controlling its operation as well as operation of the motor 26. The collecting and decoding means may take any conventional form for suitably decoding the reflected light 18c modulated by the barcode 12 for decoding the information stored therein.

As shown in FIG. 1, the collection mirror 32 preferably includes a central aperture which allows the collection mirror 32 to be optically aligned with the target 28 so that the laser beam 18 may pass through the aperture through the target for being diffracted in the facets 20 and reflected by the pattern mirrors to the barcode 12, with the reflected light 18c traveling the reverse path back to the collection mirror 32 which focuses the reflected light to the photodetector 34 for decoding. This allows a compact assembly of the various components of the scanner 10 illustrated in FIG. 1 including the relatively thin reflector disk 24 itself. The laser 14 may be mounted parallel to the disk 24, with a suitable folding mirror 38 being aligned between the target 28 and the laser 14 for improving the compactness of the scanner assembly.

A significant advantage of the scanner 10 is the compact and thin deflector disk 24 with the integral diffraction facets 20 therein. The individual facets 20 including the different diffractive gratings 22a–d thereon may be integrally formed in the disk 24 using the conventionally known compact disk (CD) replication process which has substantially reduced the cost of manufacturing CDs.

Just like a typical CD, the diffraction disk 24 may be inexpensively manufactured using conventional injection molding as illustrated schematically in FIG. 3. A master disk may be conventionally manufactured using a suitable tool for forming the minute diffractive gratings 22a–d in the four facet regions of the disk. For example, the diffraction rulings may be conventionally formed with direct laser writing on a photoresist medium.

Grooves in a typical CD are about 1.6 microns wide, and the comparable grooves in a Digital Versatile Disk (DVD) are about 1.2 microns wide. The rulings of the gratings 22a–d have their size in this order and are preferably less than 1 micron wide, and may be similarly formed. Injection molding of a suitable transparent optical material may then be used for forming the individual deflector disk 24 in mass production. This is a significant improvement and simplification over forming the holographic deflectors described above in the Background section, with an attendant reduction in cost.

Figure 5:
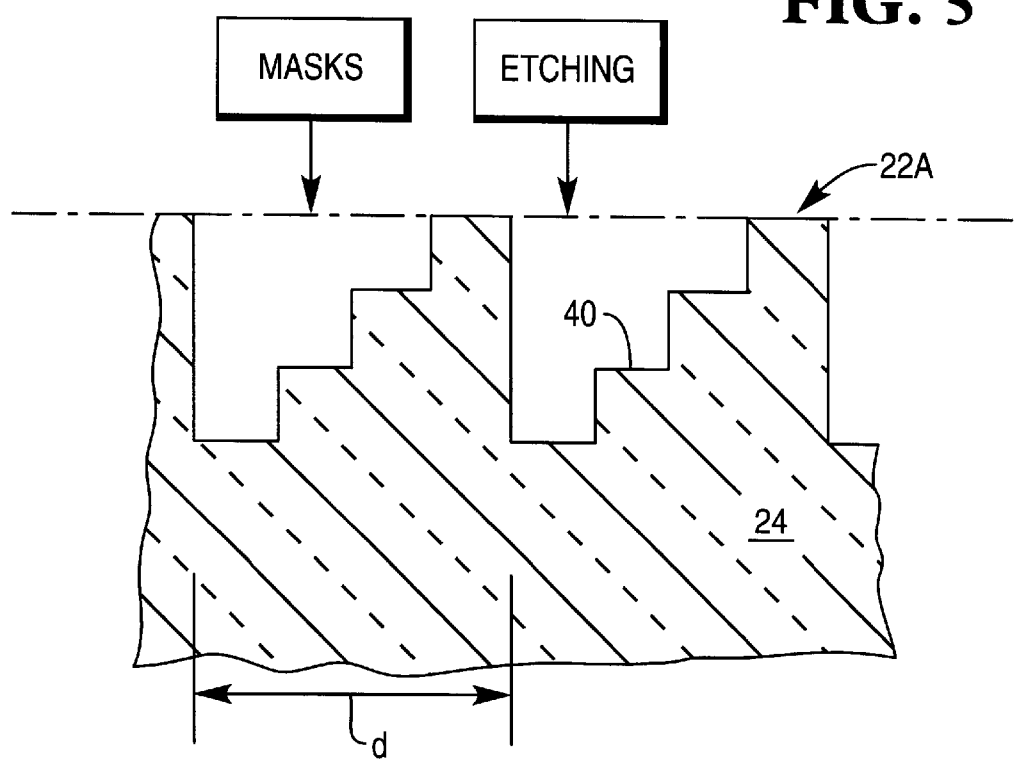
FIG. 5 is an elevational sectional view like FIG. 3 illustrating a blazed diffractive grating in accordance with an alternate embodiment of the present invention.

FIG. 5 illustrates an alternate embodiment of the diffractive deflector 24 wherein each of the facet gratings 22a–d has a stepped saw tooth blazed configuration. The continuous straight sawtooth configuration of the gratings illustrated in FIG. 3 may be approximated by discrete steps 40 in the FIG. 5 embodiment. This allows the blazing feature to be effected in a staircase configuration as shown in FIG. 5 as an approximation thereof which may be conveniently manufactured using conventional photolithography. The ruling steps are preferably configured as powers of two including four steps as illustrated and, eight, sixteen, or higher (not shown). As the number of phase steps increases, the diffraction efficiency increases. However, for a given grating constant d, the increasing number of steps 40 increases the difficulty of forming such small steps.

For example, in photolithography, a corresponding set of masks is used to expose a photoresist layer coated on a suitable optical media substrate. After developing the exposed photoresist, the steps 40 are created using conventional etching of the substrate. The individual steps 40 are therefore made in successive manufacturing steps corresponding with each of the mask and etching steps until the required sawtooth configuration is achieved.

The desired mask may be designed in a computer and transformed to a hard copy of transparent material, or the required design may be transformed directly to expose the photoresist using a modulated laser. Alternatively, the step sawtooth gratings illustrated in FIG. 5 may be manufactured using the injection molding procedure described above provided the individual steps 40 are not too numerous or small in configuration for acceptable injection molding.

In the embodiment illustrated in FIG. 1, the pattern mirrors M1–4 are disposed above the disk 24, and the collection mirror 32 and laser 14 are disposed below the disk 24 to define a transmissive deflector disk 24 which allows the laser beam 18 to pass vertically upwardly through the disk 24 and into the respective facets 20. In this way, certain components of the scanner 10 may be disposed above and below the disk 24 for adding variability in the packaging thereof for increasing the compactness of the scanner.

Figure 6:
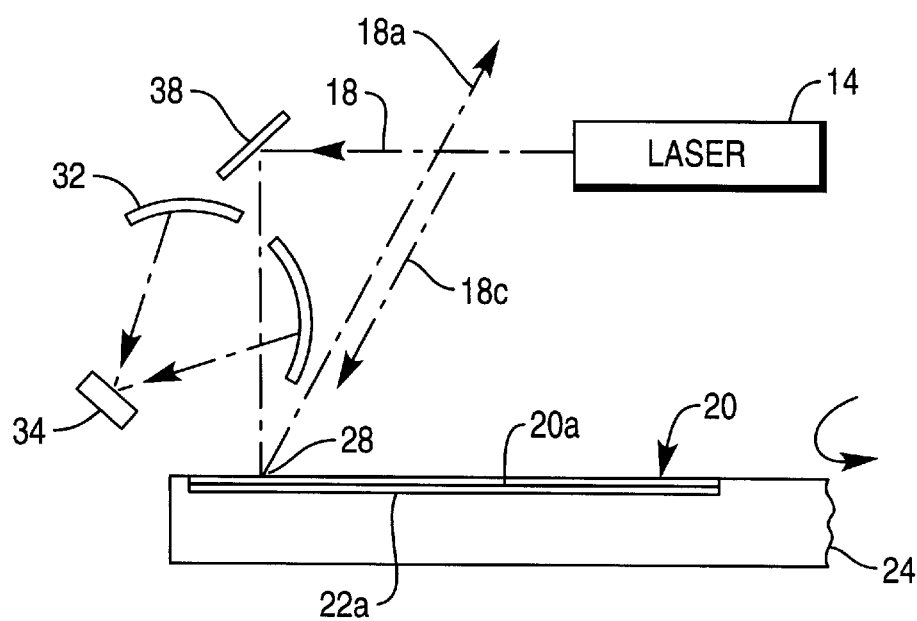
FIG. 6 is a schematic, elevational view of a portion of a barcode scanner like FIG. 1 in accordance with another embodiment of the present invention for reflecting the laser beam from atop the diffracting gratings thereon.

FIG. 6 illustrates an alternate embodiment of the scanner shown in FIG. 1 which is much the same, with the facets 22a–d again being disposed atop the disk 24. But in this embodiment, the facets are reflective or include a reflective layer 20a disposed thereatop. The laser 14 may then be disposed above the disk 24 to project the laser beam 18a downwardly at the target 28 atop the facets 20 for reflection and diffraction upwardly therefrom. In this reflective deflection embodiment, the facets 20 may be readily coated with a suitable reflective coating as in the conventional CD. This allows the incident laser beam 18a to reflect off the facets and be diffracted by the gratings 22a–d in the same manner as in the first embodiment disclosed above for producing the respective scan lines.

Like the FIG. 1 embodiment, the FIG. 6 embodiment may also include the same pattern mirrors M1–M4 disposed above the disk 24 for steering the respective scan beams 18a through the window 30 to the barcode 12. However, the collection mirror 32 and cooperating photodetector 34 are also disposed above the disk 24 unlike the FIG. 1 embodiment. Similarly, the laser 14 may also be disposed above the disk 24 with its cooperating folding mirror 38 reflecting the incident laser beam 18 through the central aperture of the collection mirror 32 to engage the respective facets 20 during operation. The FIG. 6 embodiment allows additional versatility in controlling the placement of the operating components of the scanner for improving the compact arrangement thereof.

Compared to a conventional polygonal spinner barcode scanner, the diffractive optic disk 24 has substantially less windage, and therefore may be rotated significantly faster. This increases the repetition rate of each scan line and improves barcode reading capability. The diffractive optic disk also offers a new degree of freedom in the design of the scan pattern. And, the flat profile of the disk 24 allows significant reductions in overall depth of the scanner 10 for improving compactness.

And, as compared to conventional holographic barcode scanners, the present invention eliminates the need for the holographic deflector since the individual diffractive facets 20 do not use holograms therein. The diffractive gratings 22a–d may be conveniently manufactured using conventional injection molding or photolithography techniques for providing a substantial reduction in cost over holographic scanners. And, the blazed diffractive gratings diffract light in a manner different than holograms and do not rely on the original light paths used in forming the holograms for subsequent operation. The diffractive gratings therefore allow different cooperation of the scanner components for producing individual scan lines and collective patterns thereof in a compact package.

The exemplary scan line pattern illustrated in FIG. 4 may be formed using four facets and four cooperating pattern mirrors M1–M4, and the single laser 14. If desired, however, multiple light sources may be used for creating more complex scan patterns and enhanced coverage of the barcode 12. The pattern mirrors may be used in various combinations corresponding to individual facets or groupings thereof. And, multiple collection systems may also be used for the reflected light from the barcode 12 as desired.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

1. A scanner comprising:
   a laser for projecting a laser beam;
   a facet having a blazed diffractive linear plane grating; and
   means for rotating said facet relative to said laser to traverse said laser beam across said grating to diffract said laser beam into a scan line.

2. A scanner according to claim 1 further comprising:
   a plurality of said facets each having a different blazed diffractive grating; and
   said rotating means are effective for sequentially rotating said facets in turn past said laser to produce different scan lines by diffracting said laser beam across said gratings thereof.

3. A scanner according to claim 2 wherein said facets are coplanar.

4. A scanner according to claim 2 wherein each of said facet gratings has a sawtooth blazed configuration.

5. A scanner according to claim 4 wherein each of said facet gratings has a step sawtooth blazed configuration.

6. A scanner according to claim 2 wherein said rotating means comprise:
   a flat disk having said facets spaced circumferentially apart on one side thereof; and
   a motor operatively joined to said disk for spinning said disk to rotate said facets in turn past said laser.

7. A scanner according to claim 6 wherein:
   said facets are disposed adjacent a perimeter of said disk; and
   said laser is stationary, and optically aligned with a target adjacent said disk perimeter for projecting said laser beam in turn along arcuate paths on said facets.

8. A scanner according to claim 7 further comprising a plurality of pattern mirrors optically aligned with said laser target and oriented differently for cooperating with respective ones of said facets to steer said diffracted scan lines therefrom together into an intersecting scan pattern.

9. A scanner according to claim 8 further comprising:
   a window for projecting said scan pattern therethrough to a barcode positionable thereat;
   means for collecting light reflected from said barcode upon traverse thereof by said scan lines; and
   means for decoding said reflected light.

10. A scanner according to claim 9 wherein said collecting means comprise a collection mirror optically disposed between said laser and disk for focusing said reflected light.

11. A scanner according to claim 10 wherein said decoding means comprise:
    a photodetector optically aligned with said collection mirror for detecting said focused light therefrom; and
    a controller operably joined to said photodetector for decoding said light detected thereby.

12. A scanner according to claim 11 wherein:
    said facets are disposed atop said disk;
    said disk is transparent below said facets; and
    said laser is disposed below said disk to project said laser beam upwardly through said disk to said facets thereatop to diffract said scan lines upwardly above said disk.

13. A scanner according to claim 12 wherein:
    said pattern mirrors are disposed above said disk; and
    said collection mirror is disposed below said disk.

14. A scanner according to claim 11 wherein:
    said facets are disposed atop said disk and are reflective; and
    said laser is disposed above said disk to project said laser beam downwardly at said facets for reflection and diffraction upwardly therefrom.

15. A scanner according to claim 14 wherein:
    said pattern mirrors are disposed above said disk; and
    said collection mirror is disposed above said disk.

* * * * *